US011942064B1

(12) United States Patent
Sobieralski

(10) Patent No.: US 11,942,064 B1
(45) Date of Patent: Mar. 26, 2024

(54) APPARATUS, SYSTEM AND METHOD FOR ATTACHING GRIPPING MEMBERS TO A MUTE UTILIZED WITH MUSICAL INSTRUMENTS

(71) Applicant: Nathan James Sobieralski, Madera, CA (US)

(72) Inventor: Nathan James Sobieralski, Madera, CA (US)

( * ) Notice: Subject to any disclaimer, the term of this patent is extended or adjusted under 35 U.S.C. 154(b) by 0 days.

(21) Appl. No.: 17/945,972

(22) Filed: Sep. 15, 2022

Related U.S. Application Data

(60) Provisional application No. 63/344,520, filed on May 20, 2022, provisional application No. 63/248,345, filed on Sep. 24, 2021.

(51) Int. Cl.
*G10D 9/06* (2006.01)

(52) U.S. Cl.
CPC .................................... *G10D 9/06* (2013.01)

(58) Field of Classification Search
CPC .. G10D 9/06; G10D 9/00; G10D 3/00; G10D 1/00
See application file for complete search history.

(56) References Cited

U.S. PATENT DOCUMENTS 5,488,893 A 2/1996 Lewis et al.
2016/0049138 A1* 2/2016 Adkins .................. G10D 7/10 84/400

OTHER PUBLICATIONS

Tuba Mutes—Balu Musik—Hand Crafted Tuba Mutes, website, Internet, downloaded Jan. 24, 2022, 4 pages, U.S.

* cited by examiner

*Primary Examiner* — Kimberly R Lockett
(74) *Attorney, Agent, or Firm* — Richard A. Ryan

(57) ABSTRACT

An apparatus for removably attaching gripping members to a mute to hold the mute inside the bell of a musical instrument while the instrument is being played or moved. The apparatus has a gripping member that grips the inner surface of the bell, a rail associated with the outer surface of the mute and a tray member that removably engages the rail while moveably supporting the gripping member. In one configuration, adhesives attaches the rail to the mute and the gripping member to the tray member and the tray member slidably engages the rail. A latch securely locks the tray member on the rail. The system includes the apparatus, additional gripping members, mute and instrument. The method describes the steps of attaching and replacing gripping members on a mute to easily and quickly reposition the mute in the bell or allow use of the mute with other instruments.

23 Claims, 9 Drawing Sheets

APPARATUS, SYSTEM AND METHOD FOR ATTACHING GRIPPING MEMBERS TO A MUTE UTILIZED WITH MUSICAL INSTRUMENTS

CROSS-REFERENCE TO RELATED APPLICATIONS

This patent application claims priority to U.S. Provisional Patent Application Ser. No. 63/344,520 filed May 20, 2022 and to U.S. Provisional Patent Application Ser. No. 63/248,345 filed Sep. 24, 2021.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to musical instruments and to devices utilized with a musical instrument to modify the sound that is produced by the musical instrument. In particular, the present invention relates to apparatuses, systems and methods for attaching cork or other gripping members to a mute that is used with musical instruments. Even more particularly, the present invention relates to apparatuses, systems and methods of removing and reinstalling such gripping members to a mute used with brass and other musical instruments without the need for specialized tooling or adhesives and without making permanent modifications to the gripping members.

B. Background

Musicians who play certain musical instruments, particularly brass instruments such as the trumpet, trombone, french horn, euphonium, tuba and the like, sometimes utilize a mute in the bell of the instrument to alter the character of the instrument's sound. A mute is a hollow, conical apparatus made of metal, wood, plastic or composites having a larger end that is closed and a smaller end that is open. In one common use, a mute is inserted into and held within the bell of the brass instrument by corks or other gripping members, which are referred to herein collectively as "gripping members", that are attached to the outer circumference of the portion of the mute which is inserted into the bell of the musical instrument. The purpose of the gripping members is to provide a gripping surface between the mute and the bell of the instrument so the mute will remain in the bell without falling out and to allow the mute to be easily removed from the bell of the instrument when the mute is not needed. Typically, the gripping members are affixed to the body of the mute with an adhesive and are not easily removed from the mute. If a gripping member detaches from the mute, the mute is effectively rendered useless until the gripping member is reattached with an appropriate adhesive.

As generally well known to persons who play musical instruments, particularly brass instruments, it is sometimes necessary to adjust the tune of a mute for an instrument by reducing the thickness of the gripping members so the mute may be inserted further into the bell of the instrument or using thicker gripping members so the mute may be positioned more toward the flared end of the bell of the instrument. However, once the thickness of the gripping members is reduced, the user is unable to reverse the procedure to, for instance, position the mute further outward in the bell unless he or she removes the gripping members from the mute and installs, using adhesive, new gripping members. To position the mute further outward typically requires the user to remove the existing gripping members and replace them with thicker gripping members. As well known to musicians, in addition to the foregoing, different makes and models of musical instruments often have different sized bell flares. As a result, once the thickness of the gripping members on a mute has been set or altered for use with a particular instrument, the mute with the gripping members is unlikely to work well with other musical instruments unless the existing gripping members are removed and then replaced.

Presently, the typical gripping member for a mute that is utilized in a bell of a brass or other musical instrument comprises a strip of cork or cork-like material, such as neoprene-enhanced composites and the like, that has adhesive on the back side of the strip which is covered with a removable film or like cover that is removed by the user before sticking the strip to the outer surface of the mute where the mute will engage the bell. Some gripping members are configured in a generally conical shape and are positioned entirely around the outside surface of the mute where the mute will engage the bell. Some users utilize clips that secure a mute to the flared open end of the bell of the brass instrument. Other users will hold a mute with his or her hand at the flared end of the bell while he or she is playing the instrument. U.S. Pat. No. 5,488,893 to Lewis, et al. describes a mute for a musical instrument that has a plurality of ribs that are integrally formed along the inerrable length of the outer surface of the mute. This patent also describes the use of a plurality of plugs on the inerrable portion of the mute that are each independently threadably adjustable relative to the outer surface of the mute so they can be set at different heights. The ribs or plugs are configured to engage the interior surface of the bell of a musical instrument.

Despite the availability of different types of devices, systems and methods of removably positioning a mute inside the bell of a musical instrument, particularly brass instruments, to alter the sound produced by an instrument, there is a need for an improved apparatus, system and method for attaching gripping members to the outer surface of a mute so the user can adjustably and removably position the mute in the bell of a musical instrument. More specifically, what is needed is an improved apparatus, system and method for attaching gripping members to a mute so the user can removably position the mute inside the bell of a musical instrument to allow the user to easily and quickly adjust the position of a mute relative to the bell of the instrument so he or she may further alter the sound of the instrument or be able to use the mute with an instrument having a different sized bell. The new apparatus, system and method for attaching gripping members to a mute should allow the user to securely position a mute inside a bell of a musical instrument in a manner that will prevent the mute from easily falling out of the bell while moving or playing the instrument. The new apparatus, system and method should allow the user to change the thickness of the gripping members on a mute so he or she can adjust the position of the mute inside the bell of a musical instrument without utilizing adhesives or any specialized tools and without making permanent modifications to the gripping members that are utilized to hold the mute in place. Such a new apparatus, system and method should comprise components that easy to use and which are compatible with the mute and the bell of a musical instrument so as to not damage the mute or the instrument. Preferably, the new apparatus, system and method for attaching gripping members to a mute will be relatively inexpensive to manufacture so that they may be widely utilized by musicians who use a mute with a brass and other musical instrument.

SUMMARY OF THE INVENTION

The following presents a simplified summary of the disclosure of the present invention in order to provide a basic understanding of the invention to the reader. As such, this Summary is not an extensive overview of the disclosure and it does not identify key/critical elements of the invention or delineate the scope of the invention. The sole purpose of this Summary is to present some concepts disclosed herein in a simplified form as a prelude to the more detailed description that is presented later.

The use of terms such as "including", "comprising" or "having" and variations thereof herein is meant to encompass the items listed thereafter and equivalents thereof. The terms "a" and "an" herein do not denote a limitation of quantity, but rather denote the presence of at least one of the referenced items. Further, the use of terms "first", "second", and "third", and the like, herein do not denote any order, quantity, or importance, but rather are used to distinguish one element or feature of an element from another. The term "and/or," when used herein with a list of two or more items, means that any one of the listed items can be employed by itself, or any combination of two or more of the listed items can be employed.

The new apparatus, system and method for attaching gripping members to a mute that is utilized with musical instruments of the present invention provides the benefits and solves the problems identified above. That is to say, the present invention is directed to a new apparatus, method and system for attaching gripping members to the outer surface of a mute to allow a user to selectively position the mute inside the bell of a brass or other musical instrument so as to alter the sound from the instrument. Specifically, the present invention is a new apparatus, system and method of allowing a user to easily and quickly change the gripping members on a mute so he or she may adjust the position (depth) of the mute inside the bell of a musical instrument to alter the sound of the instrument or use the mute with an instrument having a differently configured bell. The new apparatus, system and method for attaching gripping members to a mute allows the user to securely and selectively position the mute inside the bell of a musical instrument in a manner that prevents the mute from easily falling out of the bell while he or she is moving or playing the instrument. The apparatus, system and method for attaching gripping members to a mute of the present invention allows the user to adjust the depth of the mute in the bell of a musical instrument without the use of adhesives or any specialized tools and without making permanent modifications to the gripping members. The new apparatus, system and method utilizes components, particularly the gripping members, that are easy to use and compatible with the mute and the bell of a brass or other musical instrument so as to not damage the mute or instrument. Use of the new system allows easy, simple, and user-friendly replacement of damaged or worn gripping members by simply sliding off the damaged or worn gripping members of a pre-positioned rail and then sliding on a new tray member, having a gripping member attached thereto, onto the rail. In the preferred embodiments of the present invention, the new apparatus, system and method for attaching gripping members to a mute so the mute may be selectively positioned inside the bell of a musical instrument is relatively inexpensive to manufacture so that the apparatus, system and method of the present invention may be widely utilized by musicians who play brass and other musical instruments.

In one embodiment of the present invention, the new apparatus for attaching gripping members to a mute that is utilized with a musical instrument having a bell generally comprises a rail configured to be attached to an outer surface of the mute, a rail attachment mechanism associated with the rail, a tray member having a body with a top surface and a bottom surface, a tray attachment mechanism associated with the body of the tray member, and a gripping member attached to or integral with the body of the tray member. The rail attachment mechanism of the rail and the tray attachment mechanism of the tray member are configured in corresponding arrangement to allow the tray member to be removably attached to the rail when the rail is attached to the outer surface of the mute. The gripping member has an outer surface that is selected to grip the inner surface of the bell of the musical instrument when the mute is positioned inside the bell. In one embodiment, the rail attachment mechanism and the tray attachment mechanism are cooperatively configured to allow the tray member to slidably engage the rail to removably position the tray member on the rail when the rail is attached to the outer surface of the mute. In one configuration, the two attachment mechanisms comprise dovetail configured sides or components. The preferred embodiment of the new apparatus also has a locking mechanism associated with at least one of the rail and the tray member, with the locking mechanism being structured and arranged to securely attach the tray member to the rail to prevent movement of the mute relative to the bell of the musical instrument while the user is playing or moving the musical instrument with the mute inside the bell. The locking mechanism can comprise a latch that structured and arranged to engage the rail to lockedly secure the tray member to the rail.

In one embodiment of the present invention, the new gripping member attachment system generally comprises a musical instrument having a bell with an inner surface defining an interior area of the bell, a mute sized and configured to be utilized in the interior area of the bell of the musical instrument and an apparatus for removably positioning the mute in the interior area of the bell of the musical instrument to produce a gap allowing sound to exit the bell. In one of the preferred embodiments, the apparatus comprises a rail and a gripping unit, with the gripping unit having a tray member and a gripping member and the rail being attached to or integral with the outer surface of the mute. In this embodiment, the rail has a rail attachment mechanism and the tray member having a tray attachment mechanism, with the rail attachment mechanism of the rail and the tray attachment mechanism of the tray member configured in corresponding arrangement to allow the gripping unit to be removably attached to the rail on the outer surface of the mute. The gripping member, which is attached to or integral with the tray member, has an outer surface selected to grip the inner surface of the bell of the musical instrument when the mute is positioned in the bell with the gripping unit is attached to the rail. The rail attachment mechanism and the tray attachment mechanism of the apparatus are configured as described above with regard to the new apparatus. In addition, the apparatus can include the locking mechanism described above.

In one embodiment of the present invention, the new method for attaching gripping members to a mute that is utilized with a musical instrument having a bell generally comprises the steps of: (a) providing a plurality of sets of gripping units wherein each gripping unit has a gripping member that is attached to or integral with a tray member to produce a unit thickness that is common for each set of the plurality of sets of gripping units, with the gripping member having an outer surface that is selected to grip an inner surface of the bell and the tray member being structured and arranged to engage one of a plurality of rails that are attached to or integral with an outer surface of the mute; (b) selecting a first set from the plurality of sets of gripping units having a first unit thickness to use with the mute so as to position the mute in the bell of the musical instrument to produce a first gap between the mute and an outer edge of the bell; (c) positioning one of the gripping units of the first set along one of the rails on the mute until a tray member of the gripping unit engages the rail so as to attach the gripping unit to the rail and secure a gripping member thereof to the mute; (d) repeating step (c) for each of the rails associated with the mute so each rail of the mute has a gripping unit; (e) inserting the mute into the bell of the musical instrument to produce the first gap between the mute and an outer edge of the bell; (f) removing, as may be desired, the mute from the bell of the musical instrument when a different sound is desired; (g) disengaging each of the gripping units of the first set of gripping units from each of the rails; (h) selecting a second set from the plurality of gripping units having a second unit thickness that is less than or greater than the first unit thickness of the first set of gripping units to utilize with the mute so as to position the mute in the bell of the musical instrument to produce a second gap between the mute and the outer edge of the bell that is less than or greater than the first gap; (i) positioning one of the gripping units of the second set along one of the rails on the mute until a tray member of the gripping unit engages the rail so as to position the gripping unit on the rail and secure a gripping member thereof to the mute; (j) repeating step (i) for each of the rails associated with the mute so each rail of the mute has a gripping unit; and (k) inserting the mute into the bell of the musical instrument to produce the second gap. The rails can have rail attachment mechanisms and the tray member can have the tray attachment mechanism that is described above with regard to the new apparatus. In addition, the apparatus can also include the locking mechanism described above.

Accordingly, the primary object of the present invention is to provide a new apparatus, system and method for attaching gripping members to a mute that is utilized with musical instruments having the various advantages which are set forth above and which overcome the various disadvantages and limitations that are associated with presently available apparatuses, systems and methods for attaching gripping members to a mute.

It is an important object of the present invention to provide a new apparatus, system and method for attaching gripping members to the outer surface of a mute that is positioned inside the bell of a brass or other musical instrument, that allows a user to easily and quickly change the thickness of the gripping members to alter the position of the mute inside the bell without the need for any specialized tools and without permanently modifying the gripping members.

An important aspect of the present invention is that it provides a new apparatus, system and method for attaching gripping members to the outer surface of a mute which accomplishes the objectives set forth above and elsewhere in the present disclosure.

Another important aspect of the present invention is that it provides a new apparatus, system and method for attaching gripping members to the outer surface of a mute which allows a user to easily and quickly change the gripping members on the mute so he or she may adjust the position (e.g., depth) of the mute inside the bell of a brass or other musical instrument to alter the sound of the instrument or to allow the mute to be utilized with an instrument having a differently configured (e.g., size and/or shape) bell.

Another important aspect of the present invention is that it provides a new apparatus, system and method for attaching gripping members to the outer surface of a mute which allows the user to select components of a particular thickness that will secure the mute at a desired position inside the bell of a musical instrument in a manner that prevents the mute from easily falling out of the bell while he or she is moving or playing the instrument.

Another important aspect of the present invention is that it provides a new apparatus, system and method for attaching gripping members to the outer surface of a mute which, once certain components of the apparatus are in place on the mute, to easily and quickly adjust the depth of the straight mute in the bell of a musical instrument without the use of adhesives or any specialized tools and without making permanent modifications to the gripping members.

Another important aspect of the present invention is that it provides a new system that allows easy, simple, and user-friendly replacement of damaged or worn gripping members by simply sliding the tray member having the damaged or worn gripping members off the pre-positioned rail and then sliding on a new tray member, having a new gripping member attached thereto, onto the rail.

Another important aspect of the present invention is that it provides a new apparatus, system and method for attaching gripping members to the outer surface of a mute which utilizes components, particularly the gripping members, that are readily available, easy to use and compatible with the mute and the bell of a musical instrument so as to not damage the mute or instrument.

Yet another important aspect of the present invention is that it provides a new apparatus, system and method for attaching gripping members to the outer surface of a mute which is relatively inexpensive to manufacture so that the new apparatus, system and method may be widely utilized by musicians who use a mute with a brass and other musical instrument.

As will be explained in greater detail by reference to the attached figures and the description of the preferred embodiments which follow, the above and other objects and aspects are accomplished or provided by the present invention. As set forth herein and will be readily appreciated by persons who are skilled in the art, the present invention resides in the novel features of form, construction and mode of operation presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

Figure 1:
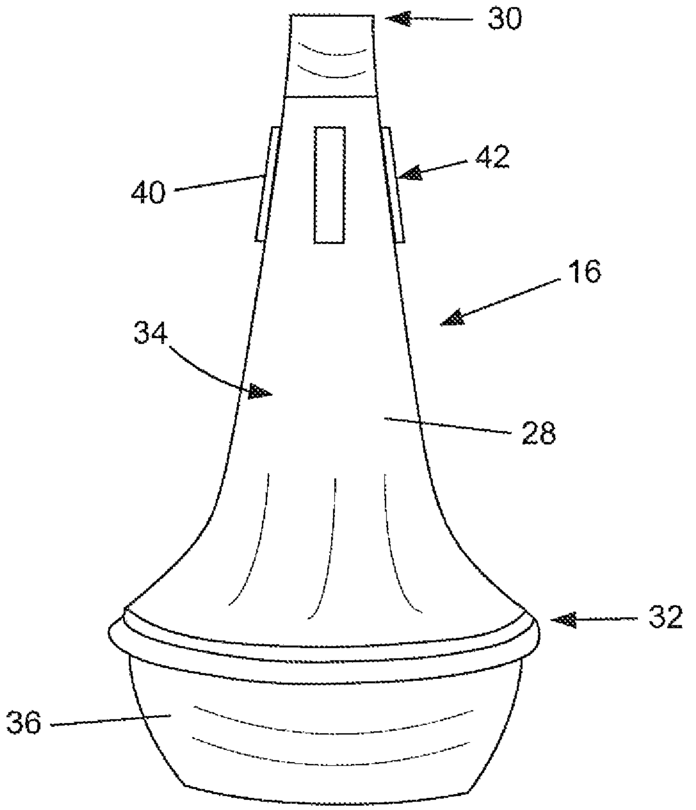
FIG. 1 (PRIOR ART)
FIG. 1 is a side view of a prior art mute with which the apparatus, system and method of the present invention can be utilized.

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular configurations for the apparatus of the present invention, as well as musical instruments and mutes with which the present invention are utilized in the system and method of the present invention, persons who are skilled in the relevant art will readily appreciate that the present invention and the musical instruments and mutes with which the invention can be utilized are not so limited. For instance, the new apparatus, system and method can comprise different types, sizes and shapes of gripping members, tray members and rails and the present invention can be utilized with different types of musical instruments and mutes. In addition, the exemplary embodiments of the present device are shown and described with only those components which are required to disclose the present invention. As such, many of the necessary components for manufacturing and using the present invention are not shown in the drawings or necessarily described below, but which are well known to persons skilled in the relevant art. As will be readily appreciated by such persons, the various elements of the present invention that are described below may take on any form consistent with forms which are readily realized by one of ordinary skill in the art having knowledge of prior art gripping members, musical instruments and mutes.

Figure 2:
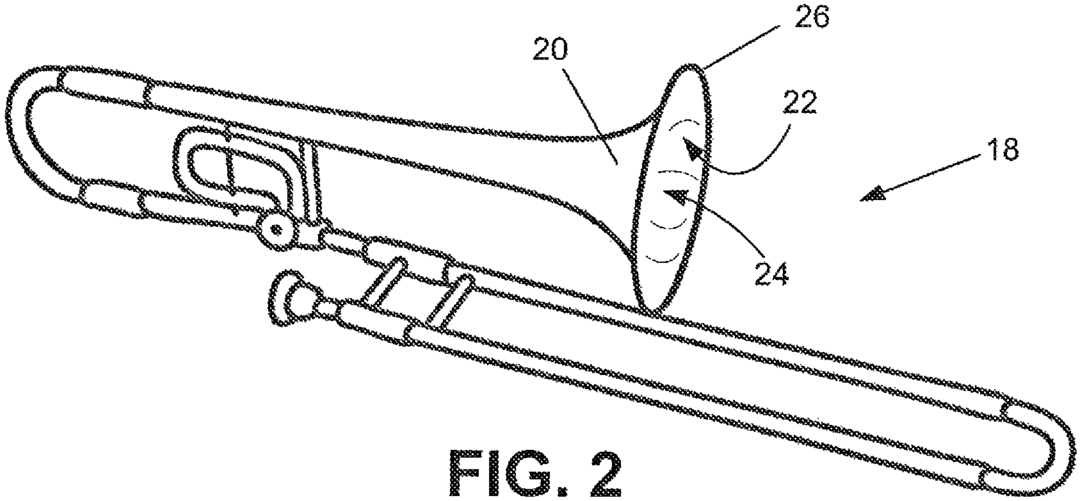
FIG. 2 (PRIOR ART)
FIG. 2 is side perspective view of a prior art brass instrument having a bell that can receive the mute of FIG. 1.

A new gripping member apparatus that is configured pursuant to one of the preferred embodiments of the present invention is shown generally as 10 in FIGS. 3-5, 16-21 and 27. A system which includes the apparatus 10 that is configured pursuant to one of the preferred embodiments of the present invention is shown generally as 12 in the chart of FIG. 25. A method which includes the apparatus 10 that is configured pursuant to one of the preferred embodiments of the present invention is shown generally as 14 in the flow chart of FIG. 26. As shown in these figures and set forth in more detail below, the new apparatus 10, system 12 and method 14 of the present invention is structured and arranged to be placed on a mute 16, such as the prior art mute of FIG. 1, that can be utilized with a musical instrument 18, such as the prior art musical instrument of FIG. 2. For purposes of the present invention, the mute 16 is sized and configured to be inserted into the bell 20 of a musical instrument 18 to alter the musical sound that is produced by the user when he or she is playing the musical instrument 18. Most commonly, though not exclusively, the musical instrument 18 will be of the type that is generally referred to as brass instruments, which includes a trumpet, trombone, french horn, euphonium, tuba and the like. The bell 20 of the musical instrument 18 has an inner surface 22 that defines an interior area 24 inward of the outer edge 26 of the bell 20, as best shown in FIG. 2.

Figure 7:
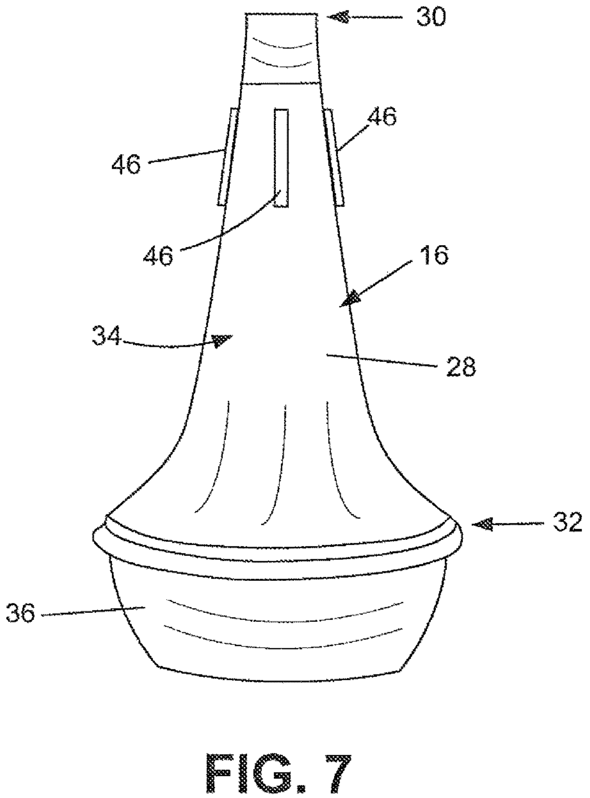
FIG. 7 is a side view of the mute of FIG. 1 shown with three of the rails of FIG. 6 shown attached to the outer surface of the mute.
Figure 22:
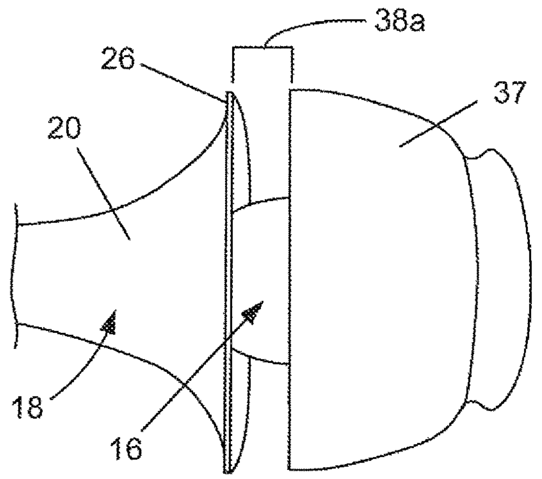
FIG. 22 is a side view of the mute of FIG. 1 inside the interior area of the bell of the musical instrument of FIG. 2 with the first gripping unit of FIG. 13 producing a first gap between the mute and an outer edge of the bell of the musical instrument.
Figure 23:
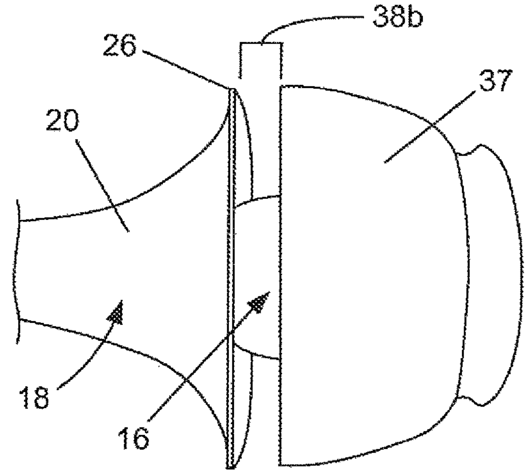
FIG. 23 is a side view of the mute of FIG. 1 inside the interior area of the bell of the musical instrument of FIG. 2 with the second gripping unit of FIG. 14 producing a second gap between the mute and an outer edge of the bell of the musical instrument.
Figure 24:
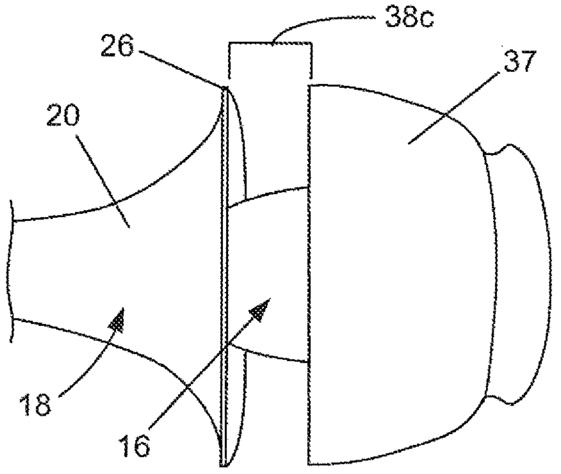
FIG. 24 is a side view of the mute of FIG. 1 inside the interior area of the bell of the musical instrument of FIG. 2 with the third gripping unit of FIG. 15 producing a third gap between the mute and an outer edge of the bell of the musical instrument.

A typical mute 16 is a hollow, conical apparatus that is made of metal, wood, plastic or composite material having a body 28 that defines an open first or inner end 30 and a closed second or outer end 32. As shown in FIG. 1, an outer surface 34 of the body 28 extends between the first/inner end 30 and the second/outer end 32 of the mute 16. As well known to persons who are skilled in the art, the mute 16 is sized and configured so the smaller first/inner end 30 can be inserted relatively deep inside the interior area 24 of bell 20 to position the larger second/outer end 32 just beyond the outer edge 26 of the bell 20 during use of the mute 16 with the musical instrument 18, as shown in FIGS. 1-2 and 22-24. Many mutes 16, such as a straight mute, have a bulb 36 positioned at the second/outer end 32 of the body 28 of the mute 16, as best shown in FIGS. 1 and 7. Other mutes 16 are referred to as cup mutes having a cup portion 37, as shown in FIGS. 22-24. During use of the mute 16 with a musical instrument 18, the second/outer end 32 of the straight mute 16 or the edge of the cup portion 37 is held in spaced apart relation to the outer edge 26 of the bell 20 to allow sound to exit the bell 20 around the mute 16 through a gap 38 between the outer edge 26 of the bell 20 and the second/outer end 32 of the mute 16 or the edge of the cup portion 37, which is best shown in FIGS. 22-24. As well known to persons skilled in the art, changing the width of the gap 38 will change the sound from the musical instrument 18.

As set forth above in the Background, a mute 16 is commonly held in place within the bell 20 of the musical instrument 18 by strips of cork or other gripping members 40 that are attached to the outer surface 34 of the body 28 of the mute 16 generally toward the first/inner end 30 of the mute 16, as shown in FIG. 1, which is inserted into the bell 20 of the musical instrument 18. The purpose of the gripping members 40 is to provide an outer or gripping surface 42 between the body 28 of the mute 16 and the inner surface 22 of the bell 20 of the musical instrument 18 when the mute 16 is used with the musical instrument 18 so the mute 16 will remain in the desired position (e.g., with a desired amount of gap 38) in the interior area 24 of the bell 20 without falling out of the bell 20 during use or movement of the musical instrument 18. The outer/gripping surface 42 of gripping member 40 is also configured to allow the mute 16 to be relatively easily removed from the interior area 24 of the bell 20 when use of the mute 16 is not needed with the musical instrument 18.

Figure 4:
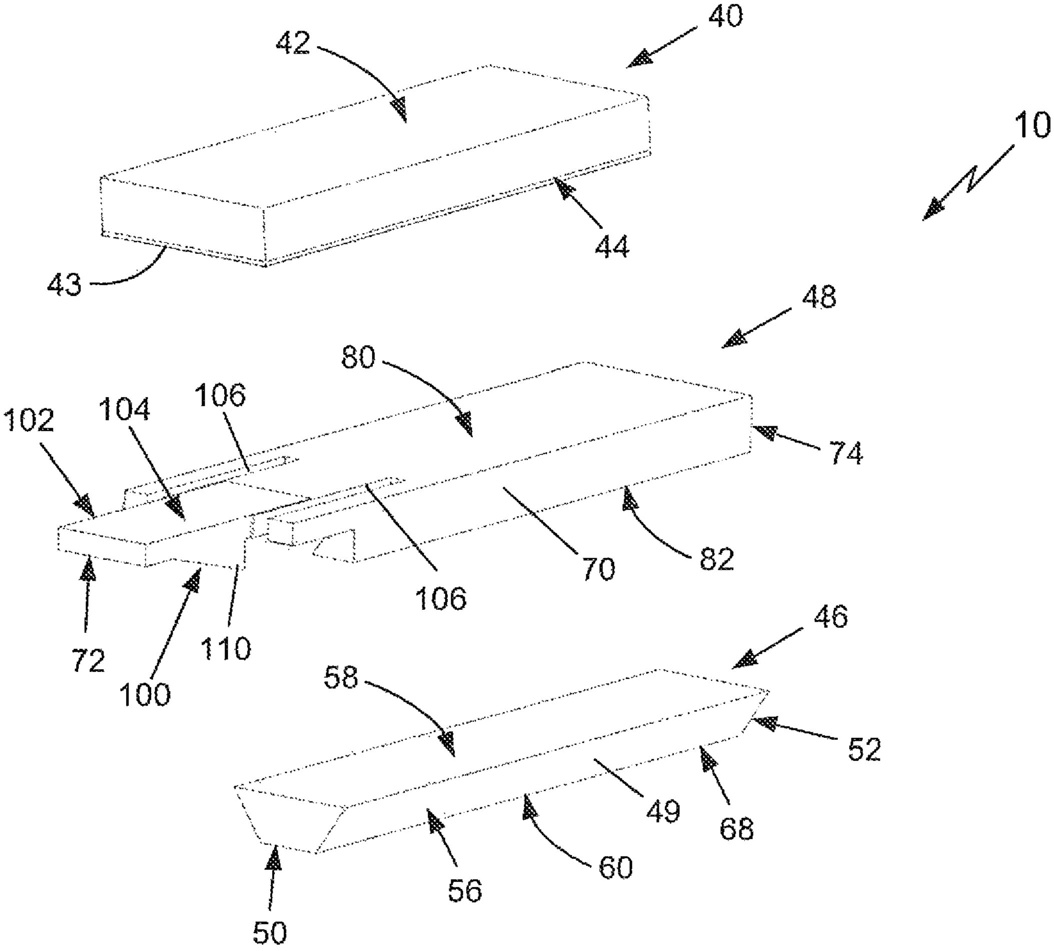
FIG. 4 is an exploded front perspective view of the apparatus of FIG. 3.
Figure 12:
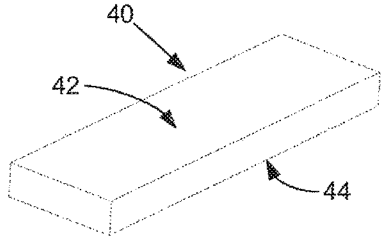
FIG. 12 is a front perspective view of the gripping member of the apparatus of FIG. 3.

As also set forth in the Background, the standard prior art method of attaching gripping members 40 to the body 28 of the mute 16 is with an adhesive 43 that is on the inner or sticking surface 44 of the gripping member 40, as shown in FIGS. 4 and 12, with regard to the gripping members 40 utilized with the new apparatus 10. Due to the adhesive 43 on the inner/sticking surface 44, the position of the gripping members 40 on the outer surface 34 of the mute body 28 provide a single sized gap 38. To change the gap 38 to obtain a different sound, requires the user to change the position of the mute 16 relative to the bell 20 of the musical instrument 18. Unfortunately, because the gripping members 40 are attached with adhesive 43, this requires the user to either alter the thickness by filing or shaving down the cork gripping members 40 or physically remove each gripping member and then attach different gripping members 40 having adhesive 43 that are either thicker or thinner or which are positioned elsewhere on the outer surface 34 of the body 28 of the mute 16 (e.g., inward or outward of the original position of the gripping members 40) to provide, as needed, a smaller or larger gap 38 that will achieve the sound desired by the musician. As well known by persons who are skilled in the relevant art, the gripping members 40 are not easily removed from the body 28 of the mute 16 and are often damaged in the process of being removed. The current configuration and use of strips of cork or like gripping members 40, including the problems with removing one set of gripping members 40 and replacing them with a new set of gripping members 40, are well known to persons who utilize a mute 16 with a musical instrument 18.

For purposes of describing the use and relative location of the various components and use of the apparatus 10, system 12 and method 14 of the present invention, the terms "front", "forward", "forwardly" and the like are utilized to refer toward the direction of the second/outer end 32 of the mute 16 in FIG. 1 and the terms "back", "rearward", "rearwardly" and the like are utilized to refer toward the direction of the first/inner end 30 of the mute 16 in FIG. 1. The directions "left", "leftward", "right", "rightward" and the like refer to a direction to the left or right when viewed from the perspective of the reader when viewing the new apparatus 10 in FIG. 5. The terms "up", "upper", "upward", "upwardly", "top" and the like refer to the direction generally away from the outer surface 34 of the mute 16 other surface on which the apparatus 10 is positioned. Likewise, the terms "down", "downward", "downwardly", "lower", "bottom" and the like refer to the direction toward the outer surface 34 of the mute 16 or other surface on which the apparatus 10 is positioned.

Figure 3:
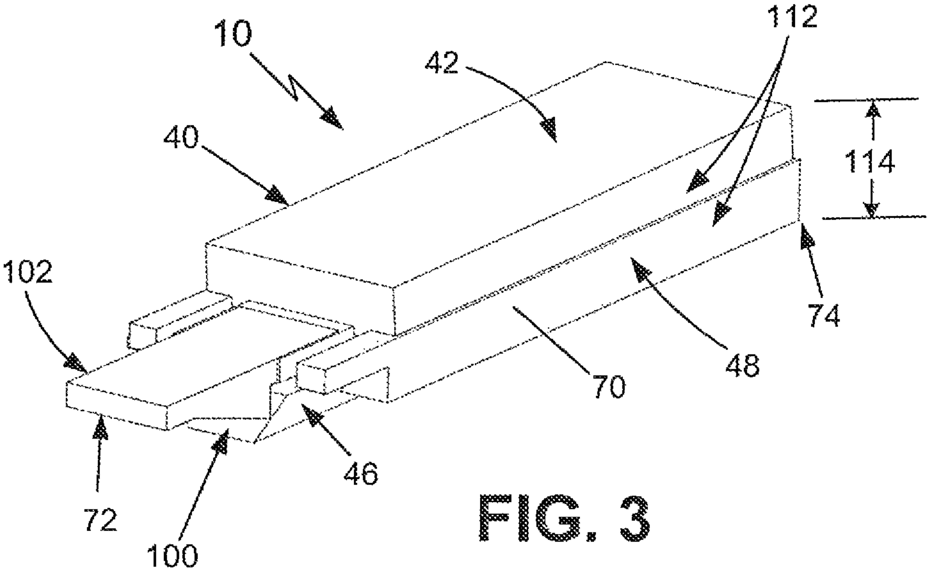
FIG. 3 is a front perspective view of an apparatus that is configured according to a preferred embodiment of the present invention for use with a mute and a musical instrument having a bell, such as the mute of FIG. 1 and the musical instrument of FIG. 2, to secure the mute in the bell of the musical instrument.
Figure 5:
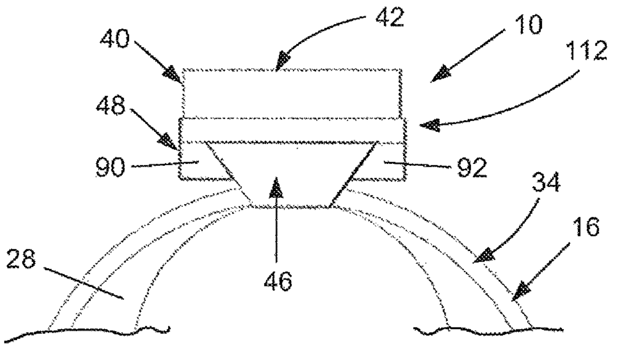
FIG. 5 is a front view of the apparatus of FIG. 3 shown mounted onto the outer surface of the mute of FIG. 1.

The new apparatus 10 of the present invention for attaching gripping members 40 to the outer surface 34 of the body 28 of mute 16 generally comprises a rail 46, a tray member 48 and a gripping member 40, as best shown in FIGS. 3-5. As set forth in more detail below, the rail 46 is attached to the outer surface 34 of the body 28 of mute 16, the tray member 48 slidably engages and locks onto the rail 46 and the gripping member 40 is attached to and carried by the tray member 48 to engage the inner surface 22 of the bell 20 of the musical instrument 18 when a mute 16 having apparatus 10 utilized therewith is inserted into the interior area 24 of the bell 20 to prevent any undesired slippage or other movement (e.g., falling out of the bell 20) of the mute 16 when the user is playing or moving the musical instrument 18 with the mute 16 in the bell 20 of the musical instrument 18. When the rail 46, tray member 48 and gripping member 40 are combined together as apparatus 10 on the outer surface 34 of the mute 16 and the mute 16 is positioned inside the interior area 24 of the bell 20, the tray member 48 will be tightly held in engagement with the rail 46 and the outer/gripping surface 42 of the gripping member 40 will be in tight engagement with the inner surface 22 of the bell 20 to securely hold the mute 16 inside the bell 20. As also set forth in more detail below, the configuration and arrangement of the rail 46, tray member 48 and gripping member 40 components of the apparatus 10 will allow the user to be able to easily and quickly remove one set of gripping members 40 and replace them with another set of gripping members 40 to allow the user to rapidly change the position of the mute 16 inside the bell 20 to achieve a different sound or to move the mute 16 to another musical instrument 20 having a different size and/or shape of bell 20, which is not obtainable with the prior art use of the gripping members 40 to secure a mute 16 inside a bell 20 of a musical instrument 18.

Figure 6:
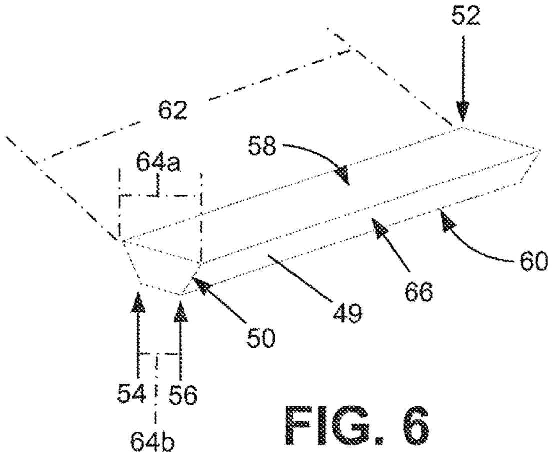
FIG. 6 is a front perspective view of the rail of the apparatus of FIG. 3.

The rail 46 of the apparatus 10 is, typically, an elongated, generally rigid member that is sized and configured to be attached to the outer surface 34 of the body 28 of the mute 16, as shown in FIGS. 4-8. The rail 46 has a body 49 with a first or front end 50, a second or back end 52, a first or left side 54, a second or right side 56, a top surface 58 and a bottom surface 60 as best shown in FIG. 6. The length 62 of the body 49 of the rail 46 is defined between the first/front end 50 and the second/back end 52 and a width 64 between the first/left side 54 and the second/right side 56. The rail 46 also has a rail attachment mechanism 66 that is configured in corresponding relation to a tray attachment mechanism 88 (as discussed in detail below with regard to the tray member 48) so the tray member 48 can slide on and off the rail 46 to, respectively, attach or remove the tray member 48 from the rail 46 to attach or remove the gripping member 40.

Figure 8:
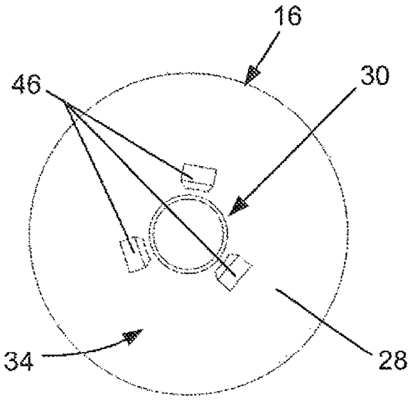
FIG. 8 is a front view of three rails of FIG. 6 shown attached around the perimeter of the mute of FIG. 1, which is shown from the first end thereof.
Figure 9:
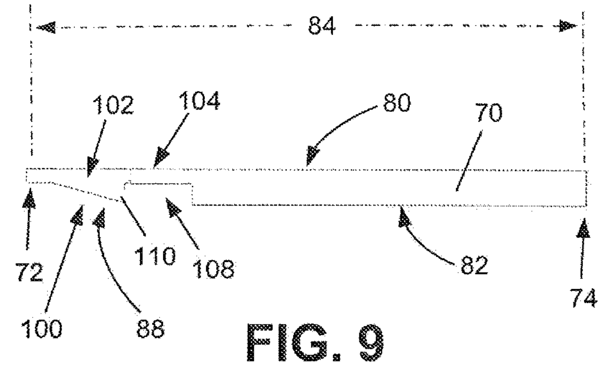
FIG. 9 is a side view of the tray member of the apparatus of FIG. 3.
Figure 10:
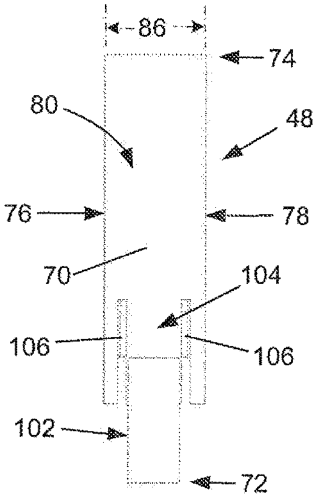
FIG. 10 is a top view of the tray member of FIG. 9.

In the embodiment shown in the figures, rail attachment mechanism 66 comprises "dovetail" shaping of the first/left side 54 and the second/right side 56 of the body 49 of the rail 46, as best shown in FIGS. 4-6. The dovetail shape for the rail 46 results in rail 46 having an upper width 64*a* at the top surface 58 and a lower width 64*b* at the bottom surface 60, with the upper width 64*a* being greater than the lower width 64*b* so as to provide a generally trapezoid shaped rail 46. As set forth below, in this embodiment, the tray attachment mechanism 88 of the tray member 48 is configured in an inverse, but corresponding, shape so the tray member 48 will slide onto or off the dovetail shaped rail 46. As will be readily appreciated by persons who are skilled in the relevant art, the rail attachment mechanism 66 can take on a wide variety of different configurations. For instance, the rail attachment mechanism 66 can comprises slots, protrusions, detents and the like on the sides 54/56 of the body 49 of the rail 46, with the tray attachment mechanism 88 of the tray member 48 being correspondingly configured so the tray member 48 will attachably engage the rail 46. In a preferred embodiment, the bottom surface 60 of the body 49 of the rail 46 is at least substantially covered with a surface attachment device 68 that is selected to allow the user to secure the rail 46 to the outer surface 34 of the body 28 of the mute 16, usually near the first/inner end 30 of the mute 16, as shown in FIGS. 5 and 7-8. In one embodiment, the surface attachment device 68 is an adhesive, such as the adhesive 43 utilized on the prior art (existing) cork or cork-like gripping members. Alternatively, the rail 46 can be integrally formed with the body 28 of the mute 16 or attached by a wide variety of other devices, including screws, bolts, rivets or the like, to the surface 34 of the body 28 of the mute 16.

The tray member 48 of the apparatus 10 is structured and arranged to engage a rail 46 that is positioned on the outer surface 34 of the body 28 of the mute 16, as shown in FIG. 5. In a preferred embodiment of the apparatus 10 of the present invention, the tray member 48 is cooperatively configured with the rail 46 so as to slidably engage the rail 46 when the rail 46 is fixedly attached to the outer surface 34 of the body 28 of the mute 16, as shown with regard to FIGS. 16-21. A tray member 48 that is configured according to a preferred embodiment is shown in FIGS. 3-5 and 9-11. In this embodiment, the tray member 48 has a body 70 having a first or front end 72, a second or back end 74, a first or left side 76, a second or right side 78, a top surface 80 and a bottom surface 82, all of which are in corresponding relation to the same ends, side and surfaces of the rail 46 to which the tray member 48 will engage. The tray member 48 has a length 84 that is defined between the first/front end 72 and the second/back end 74 and a width 86 that is defined between the first/left side 76 and the second/right side 78 of the body 70 of the tray member 48. The tray member 48 is provided with a tray attachment mechanism 88, best shown in FIGS. 3-4 and 9-11, that is structured and arranged to lockedly, but releasably, engage the rail 46, as best shown in FIGS. 3, 5, 16 and 19.

Figure 11:
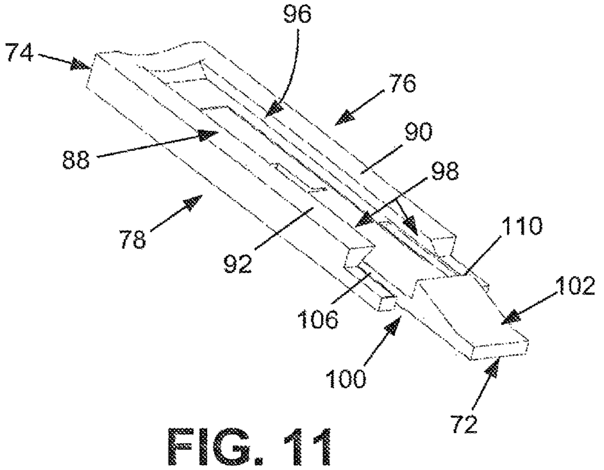
FIG. 11 is a bottom perspective view of the tray member of FIG. 9.

In a preferred embodiment, the tray attachment mechanism 88 of tray member 48 comprises a pair of rail engaging members 90 and 92 along the bottom surface 82 of the body 70 of the tray member 48, which are best shown in FIGS. 3-4 and 9-11. As best shown in FIG. 11, the rail engaging members 90/92 are positioned along the first/left side 76 of the body 70 of the tray member 48 (the first rail engaging member 90) and along the second/right side 78 of the body 70 of the tray member 48 (the second rail engaging member 92). The rail engaging members 90/92 define a cavity 96 in at the bottom surface 82 of the body 70 of the tray member 48. During attachment of the gripping member 40 to the mute 16 using the new apparatus 10, system 12 and method 14 of the present invention, the tray member 48 will slide over the rail 46 with the rail engaging members 90/92 of the tray attachment mechanism 88 engaging the rail attachment mechanism 66 and the body 49 of the rail 46 being received in the cavity 96 of the tray member 48. This is facilitated by the inner side 98 of each of the rail members 90/92, which is the side facing inward toward the cavity 96 of the tray member 48, being configured in corresponding relation with the sides 54/56 of the rail 46. In the preferred embodiment, with the rail attachment mechanism 66 comprising the two sides 54/56 having a dovetail shape, the inner sides 98 have an corresponding sized and shaped, but inverse, dovetail configuration so as to slidably engage (relatively tightly) the sides 54/56 of the rail 46. As will be readily appreciated by persons who are skilled in the relevant art, this will allow the tray member 48 to slide along the rail 46 and be securely held onto the rail 46.

The apparatus 10 of the present invention also comprises a locking mechanism 100 which is structured and arranged to lockedly engage the rail 46 that is attached to the outer surface 34 of the mute 16. The locking mechanism 100 prevents the tray member 48, having the gripping member 40 thereon, from moving relative to the rail 46 while the mute 16 is being moved in and out of the interior area 24 of the bell 20, which causes the gripping member 40 of the new apparatus 10 to move into and out of engagement with the inner surface 22 of the bell 20, while the musical instrument 18 is being prepared for use, or in use, by a musician. In a preferred configuration of apparatus 10, the locking mechanism 100 lockedly engages the first/front end 50 of the rail 46, as best shown in FIGS. 3 and 5, to achieve the desired locking of the tray member 48 onto the rail 46. In one embodiment shown in the figures, the locking mechanism 100 comprises a latch 102 that is integrally formed with the body 70 of the tray member 48, as best shown in FIGS. 4 and 9-11. The latch 102 is a flexible section 104 of the tray member 48 that is formed from a pair of linear cutouts 106 through the body 70 and an open area 108 on the bottom surface 82 of the body 70. The open area 108 defines a downward extending engaging lip 110 on the latch 102 that is sized and configured to engage the first/front end 50 of the body 49 of the rail 46, as best shown in FIGS. 3 and 5, when the tray member 48 is engaged with (e.g., slid on) the rail 46 that is attached to the outer surface 34 of the body 28 of the mute 16.

Figure 16:
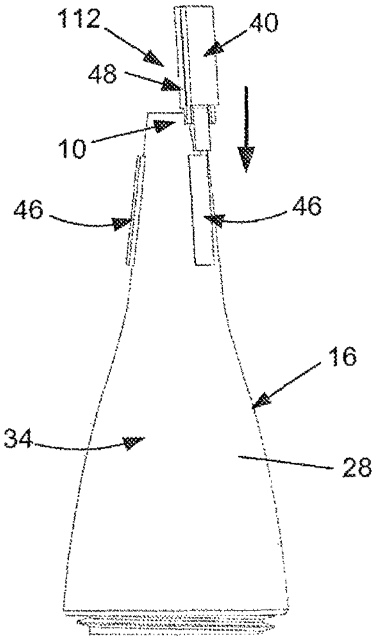
FIG. 16 is a side view of the mute of FIG. 1 having the rail of FIG. 6 on the outer surface thereof with the tray member and gripping member of FIG. 13 prepared to engage the tray member to attach the gripping member to the mute.
Figure 17:
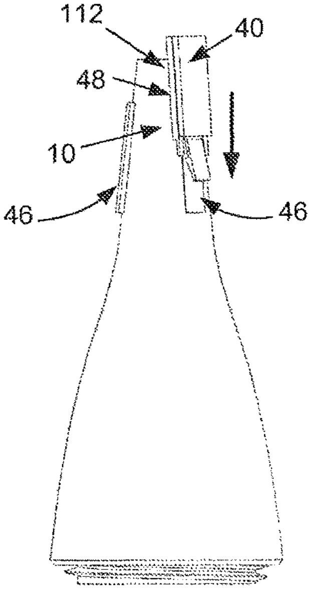
FIG. 17 is a side view of the mute and rail of FIG. 16 with the tray member and gripping member of FIG. 13 sliding along the rail to attach the gripping member onto the mute.
Figure 18:
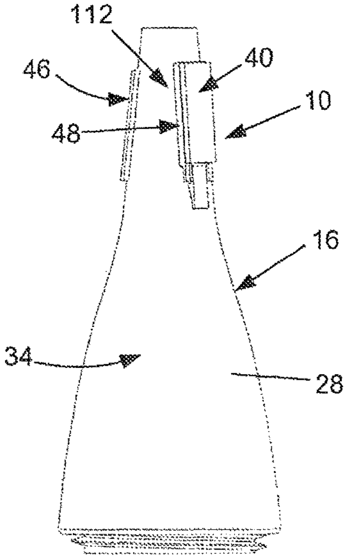
FIG. 18 is a side view of the mute and rail of FIG. 16 with the tray member and gripping member of FIG. 13 fully engaging the rail to securely attach the gripping member to the mute.
Figure 19:
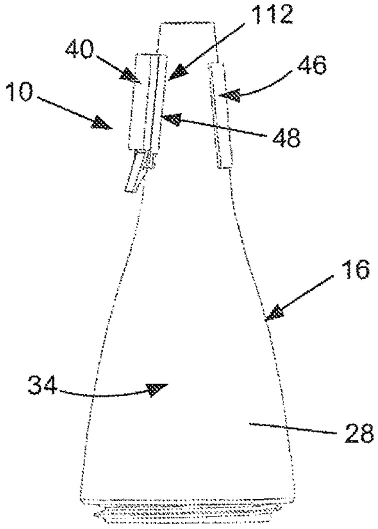
FIG. 19 is a side view of the mute and rail of FIG. 16 with the tray member and gripping member of FIG. 13 on the rail with the latch of the tray member raised to remove the gripping member from the mute.
Figure 20:
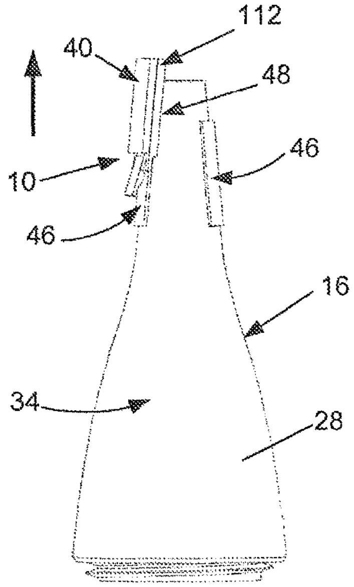
FIG. 20 is a side view of the mute and rail of FIG. 16 with the tray member and gripping member of FIG. 13 sliding along the rail as the gripping member is being removed from the mute.
Figure 21:
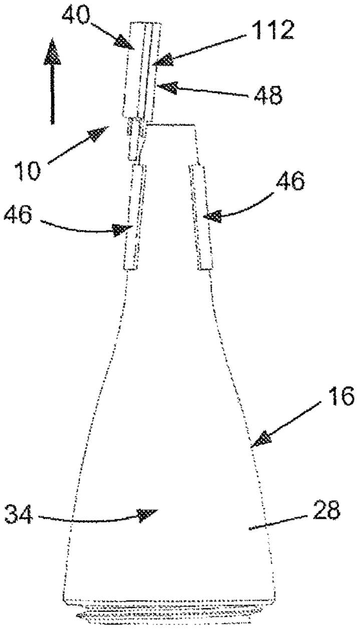
FIG. 21 is a side view of the mute and rail of FIG. 16 with the tray member and gripping member of FIG. 13 off of the rail to remove the gripping member from the mute.

In use, the locking mechanism 100 described above engages the rail 46, particularly while it is on the mute 16, when the user slides a gripping unit 112, which is a particular combination of a tray member 48 and gripping member 40 that (as set forth below) are attached together, forward along the rail 46 from the second/back end 52 to the first/front end 50 thereof, as shown in FIGS. 16-18. As shown in these figures, while tray member 48 of the gripping unit 112 is sliding forward, the flexible section 104 will flex upward to allow the engaging lip 110 to ride along the top surface 58 of the body 49 of the rail 46 until the engaging lip 110 passes the first/front end 50 of the rail 46, at which time the flexing section 104 will flex downward to push the engaging lip 110 down along the first/front end 50 of the rail 46. This downward flexing will engage the engaging lip 110 with first/front end 50 of the rail 46 to lockedly secure the tray member 48 of the gripping unit 112 on the rail 46, thereby attaching the gripping member 40 to the mute 16. The locking mechanism 100 is also structured and arranged to allow the user to quickly and easily disengage the latch 102 from the rail 46 so he or she can remove the gripping unit from the mute 16 to reposition the mute 16 in the bell 20 or to use the mute 16 with a different musical instrument 18. This is achieved by the user lifting up on the flexible section 104, typically at or near the engaging lip 110, and then sliding the tray member 48 rearward along the rail 46, with the engaging lip 110 riding along the top surface 58 of the rail 46, until the gripping unit 112 is entirely slid off of the rail 46, as shown in FIGS. 19-21. The user can then use the gripping unit 112 (gripping member 40 attached to tray member 48) with a different musical instrument 18 or reposition the mute 16 deeper or shallower inside the bell 20 of the musical instrument 18 by placing a different gripping unit 112, having a different combination of gripping member 46 and tray member 48 with more or less unit thickness 114 (e.g. the thickness of the gripping member 40 and the body 70 of the tray member 48) than the unit thickness 114 of the gripping unit 112 that the user removed from rail 46. As will be readily appreciated by persons who are skilled in the relevant art, having a supply of gripping units 112 with different unit thicknesses 114 will allow the user to rapidly change the position of the mute 16 in the bell 20 of the musical instrument 18 or to use the mute 16 with a different musical instrument 18 having a different sized and/or shaped bell 20.

The gripping member 40 of the apparatus 10 of the present invention is selected to be able to securely engage the inner surface 22 of the bell 20 when a mute 16 having the new apparatus 10 is positioned inside the bell 20. In one embodiment, which is likely to be a preferred embodiment, the gripping members for apparatus 10 of the present invention are the same as the prior art gripping members that are discussed above and in the Background and which are utilized to securely hold a mute 16 in the bell 20 of a musical instrument 18. Specifically, in this embodiment, the gripping members 40 are strips of cork, cork-like or other materials that have an outer/gripping surface 42 which is selected to engage the inner surface 22 of the bell 20 without damaging the bell 20 and in a manner that prevents the mute 16 from slipping when the mute 16 is placed inside the interior area 24 of the bell 20 of a musical instrument 18. As set forth above and in the Background, prior art gripping members 40 have an adhesive 43 on the inner/sticking surface 44 thereof that is used in the prior art to attach a gripping member 40 directly to the outer surface 34 of the mute 16. For the apparatus 10 of the present invention, the adhesive 43 is utilized to stick a gripping member 40 to the top surface 80 of the tray member 48, as best shown in FIGS. 3 and 5, to form the gripping unit 112 that is slid on and off of the rail 16 that is affixed to the outer surface 34 of the body 28 of the mute 16.

Figure 13:
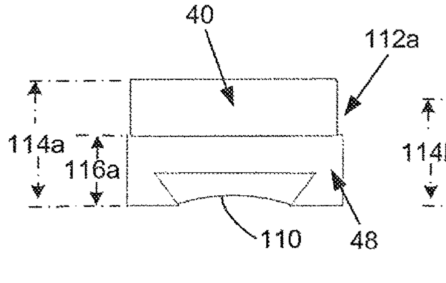
FIG. 13 is a front view of a first gripping unit having the tray member of FIG. 9 with a first tray member thickness and the gripping member of FIG. 12 attached to the tray member to define a first unit thickness.
Figure 14:
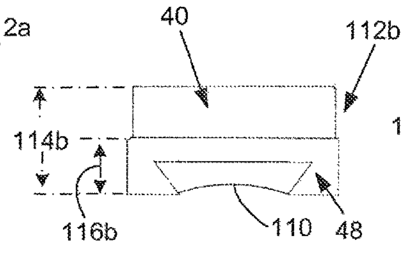
FIG. 14 is a front view of a second gripping unit having a tray member with a second tray member thickness and the gripping member of FIG. 12 attached to the second tray member to define a second unit thickness that is less than the first unit thickness of FIG. 13.
Figure 15:
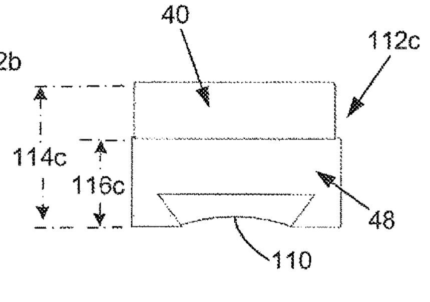
FIG. 15 is a front view of a third gripping unit having tray member with a third tray member thickness and the gripping member of FIG. 12 attached to the third tray member to define a third unit thickness that is greater than the first unit thickness of FIG. 13.

In one embodiment, the system 12 and method 14 of the present invention are utilized with tray members 48 that have different thicknesses 116, shown as first thickness **116*a*, second thickness 116*b* and third thickness 116*c*, as shown in FIGS. 13-15. Once a gripping member 40 is attached to a tray member 48 having a first thickness 116*a*, the combination of the two components form a first gripping unit 112*a* having a first unit thickness 114*a* that will define a first gap 38*a*, as shown in FIGS. 13 and 22. When a gripping member 40 is attached to a tray member 48 having a second thickness 116*b* that is less than the first thickness 116*a*, the combination will produce a second gripping unit 112*b* having a second unit thickness 114*b*, which is less than the first unit thickness 114*a*, that will define a second gap 38*b* which is narrower than the first gap 38*a*. Likewise, when a gripping member 40 is attached to a tray member 48 having a third thickness 116*c* that is greater than the first thickness 116*a*, the combination will produce a third gripping unit 112*c* having a third unit thickness 114*c*, which is greater than the first unit thickness 114*a*, that will define a third gap 38*c* which is wider than the first gap 38*a*. Typically, the musician user will prepare at least two sets 118 of gripping units 112, with each set 118 having a group of gripping units 112 (typically three) having a common unit thickness 114, by attaching a gripping member 40 to an equal number of tray members 48 having different tray member thicknesses 116, prior to using a mute 16 with a musical instrument 18. Preparing at least two sets 118 of gripping units 112 ahead of using the mute 16 with a musical instrument 18, allows the user to use one of the gripping units 112 in the set 118 with the mute 16 and then switch out, as desired, to another gripping unit 112 having a lesser or greater unit thickness 114 to produce a wider or narrower gap 38 to produce a different sound from the musical instrument 18. Therefore, the system 12 and method 14 of the present invention will utilize at least two sets 118 of gripping units 112 having a different unit thicknesses 114, with each set 118 having at least two gripping units 112 with the same unit thicknesses 114. As will be understood by persons who are skilled in the relevant art, a set 118 of gripping units 112 can have any number of gripping units 112 and the unit thickness 114 of the set 118 can be any amount that can be beneficially utilized to position a mute 16 in the bell 20 of a musical instrument 18. Likewise, the user have any number of sets 118 available for his or her use. The different sets 118 of gripping units 112 can also allow the user to easily switch use of the mute 16 to a different musical instrument 18 having a different size and shape of bell 20**.

The system 12 of the present invention, an embodiment of which is shown in FIG. 24, comprises a musical instrument 18 having a bell 20 with an inner surface 22, a mute 16 having a body 28 with an outer surface 34, at least two sets 118 of gripping units 112, namely a first set 118*a* and a second set 118, that each comprise a plurality of gripping units 112 having a common unit thickness 114. In one embodiment, the first set 118*a* can comprise three first gripping units 112*a* that each have a first unit thickness 114*a* and the second set 118 be can comprise three of either the second gripping units 112*b* or the third gripping units 112*c* having either the second unit thickness 114*b* or the third unit thickness 114*c*. In another embodiment, the user can have three sets 118, namely a first set 118*a*, a second set 118*b* and third set 118*c*, that have the corresponding gripping units 112 and unit thicknesses 114 described above. Each gripping unit 112 will comprise a gripping member 40 attached to a tray member 48 having an appropriate tray member thickness 116, as also described above, to provide the desired gap 38 when the gripping unit 112 is attached to a rail 46 on the mute 16 and the mute 16 is inserted into the bell 20 of a musical instrument 18.

Figure 25:
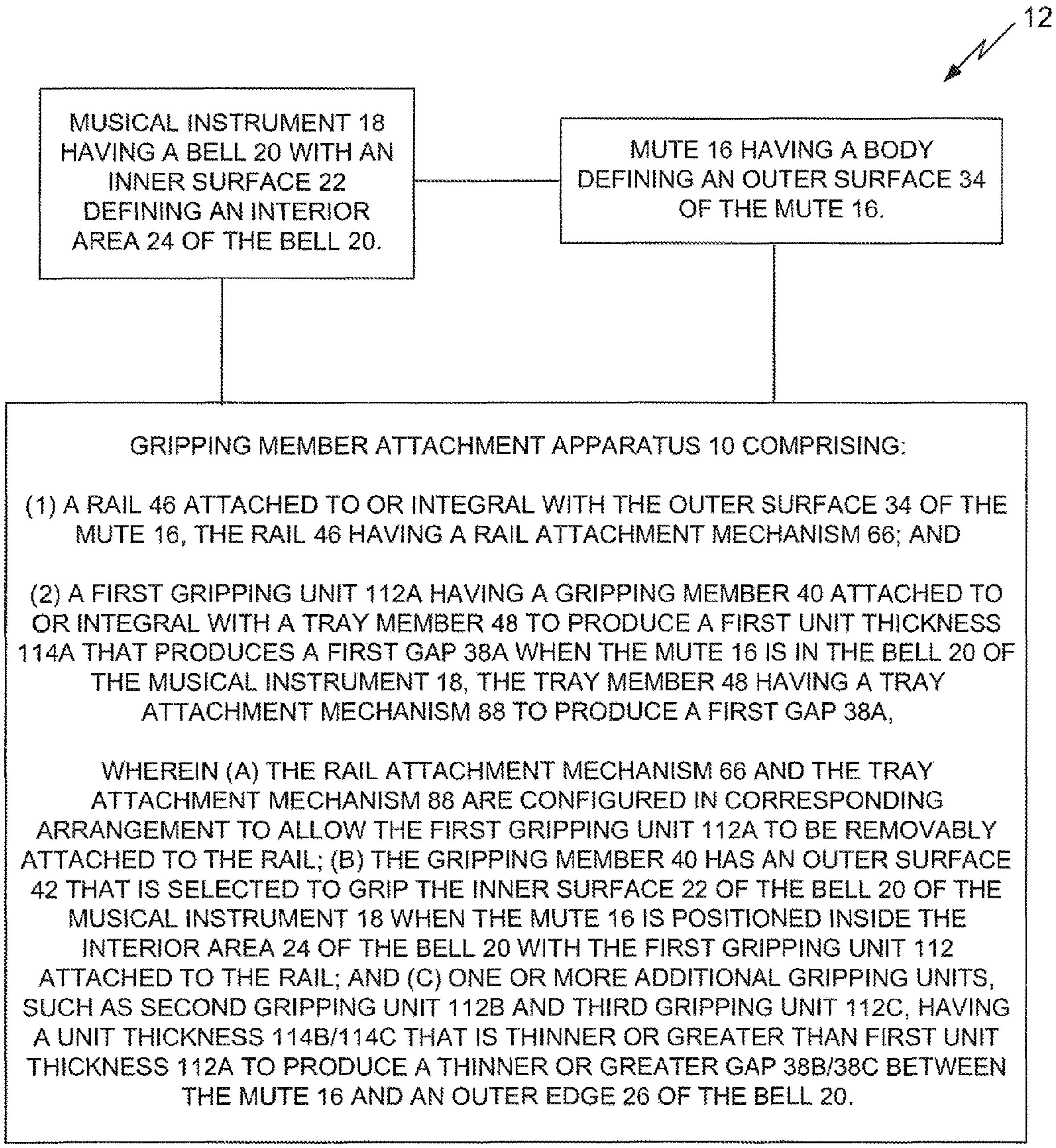
FIG. 25 is a chart showing a system configured according to a preferred embodiment of the present for removably attaching a gripping member to a mute.
Figure 26:
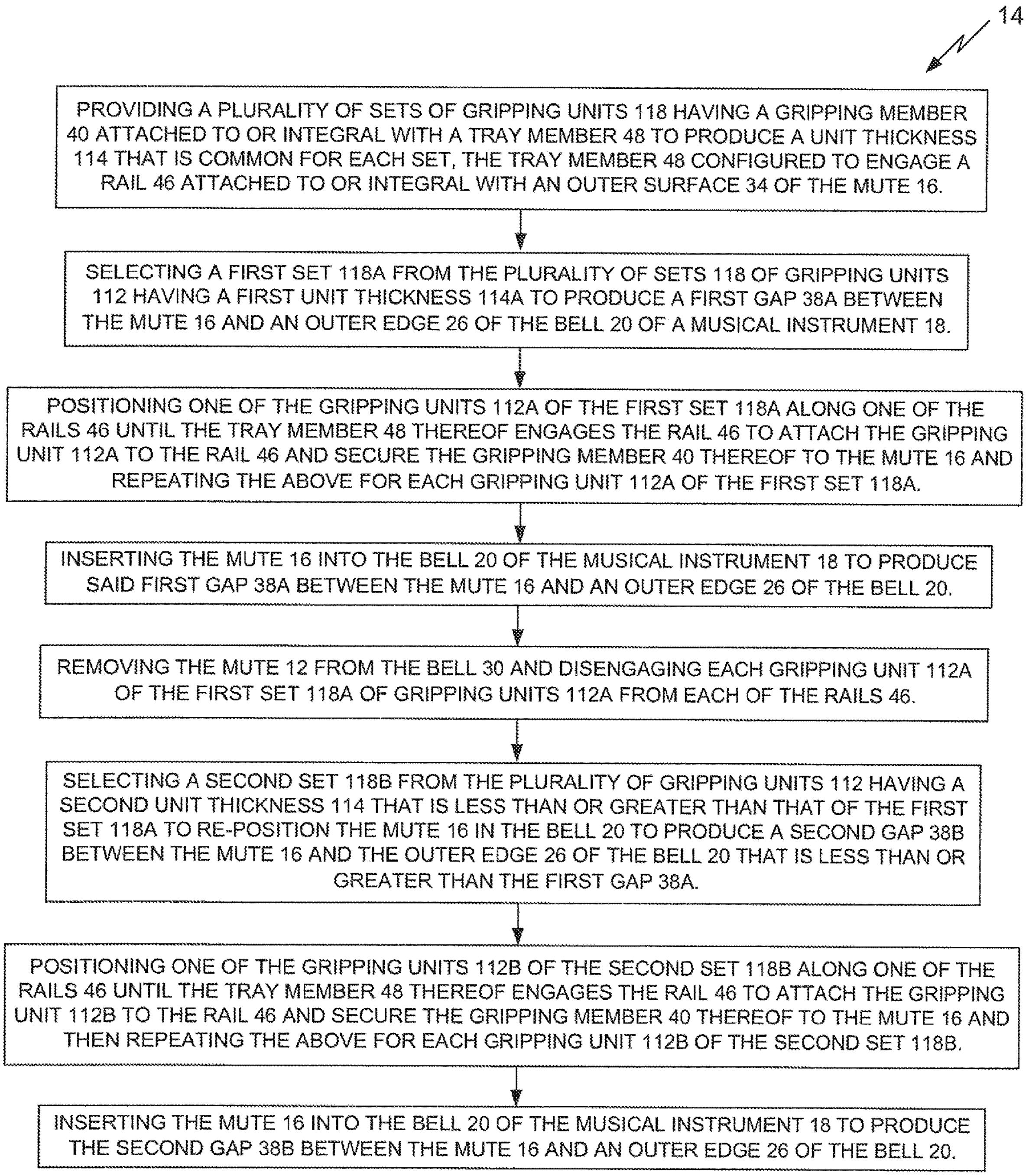
FIG. 26 is a flow chart showing a method configured according to a preferred embodiment of the present invention for removably attaching a gripping member to a mute.

On embodiment of the method 14 of the present invention is shown in FIG. 25. In this embodiment, the method 14 comprises the steps of: (a) forming a plurality of sets 118 of gripping units 112 by attaching one of a plurality of gripping members 40 to one of a plurality of tray members 48 (e.g., one gripping member for each tray member 48) having a common tray member thickness 116 for each set 118 and selecting a plurality of rails 46 so there is one rail 46 that will be utilized for each gripping unit 112 of every set 118; (b) obtaining a mute 16 for use in the bell 20 of a musical instrument 18; (c) attaching each of the rails 46 to the outer surface 34 of the body 28 of the mute 16, with each rail 46 in spaced apart relation to each other rail 46 around the circumference outer surface 34 of the body 28 of the mute 16; (d) selecting a first set 118*a* of gripping units 112*a* to use with the mute 16 so as to position the mute 16 in the bell 20 of the musical instrument 18 to achieve a first gap 38*a*; (e) sliding the gripping units 112*a* of the selected set 118*a* along the rails 46 on the mute 16 until the locking mechanism 100 of the tray member 48 of each gripping unit 112 engages a rail 46 so as to lock the gripping units 112*a* on the rail 46 to secure the gripping member 40 thereof to the mute 16; (f) inserting the mute 16 into the bell 20 of the musical instrument 18 to produce the first gap 38*a*; (g) removing the mute 16 from the musical instrument 18 to change the gripping member 40 in order to obtain a different gap 38 (e.g., gap 38*b* or gap 38*c*) to produce a different sound from the musical instrument 18; (h) disengaging the locking mechanism 100 of each gripping unit 112*a* and sliding the gripping unit 112*a* off of the rail 46 to remove the gripping member 40; (i) selecting one of a second set 118*b* or a third set 118*c* of gripping units 112*b* or 112*c* having a unit thickness 114*b* or 114*c* that is less than or greater than the unit thickness 114*a* of the first set 118*a* of gripping units 112*b* to use with the mute 16 so as to position the mute 16 in the bell 20 of the musical instrument 18 to achieve one of a second gap 38*b* or a third gap 38*c*; (j) sliding one of the gripping units 112*b* or 112*c* of the selected set 118*b* or 118*c* along one of the rails 46 on the mute 16 until the locking mechanism 100 thereof engages the rail 46 so as to lock the gripping unit 112*b*/112*c* on the rail 46 to secure the gripping member 40 thereof to the mute 16; (k) inserting the mute 16 into the bell 20 of the musical instrument 18 to produce one of the second gap 38*b* or the third gap 38*c*; and (l) repeating steps (g) through (k) as may be desired or necessary to change the sound produced by the musical instrument 18.

Figure 27:
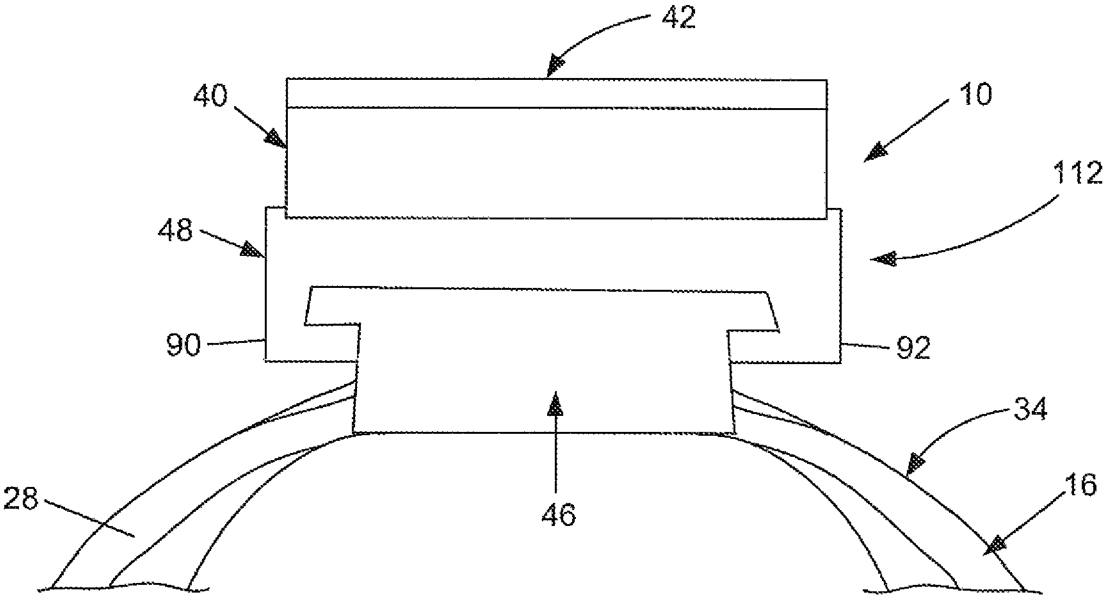
FIG. 27 is a front view of a second embodiment of the apparatus of the present invention shown mounted onto the outer surface of the mute of FIG. 1 showing an alternative configuration for the rail attachment mechanism and the tray attachment mechanism.

As set forth above, the various components of the new apparatus 10 are subject to a number of possible modifications that will still fall within the scope of the present invention. In particular, the rail 46 and tray member 48 of the new apparatus 10 can be modified in numerous ways that will still function generally as described above to removably secure gripping members 40 to the outer surface 34 of the body 28 of a mute 16. An example modification is shown in FIG. 27, which shows a rail 46 attached to the outer surface 34 of the mute 16 and a tray member 48, with a gripping member 40 attached to the top surface 80 thereof, engaged with the rail 46. In this embodiment, the rail attachment mechanism 66 of the rail 46 and the tray attachment mechanism 88 do not have the dovetail shape that is described in the first embodiment above. Instead, the rail attachment mechanism 66 of the rail 46 comprises a square or rectangular shaped main section and two outwardly extending members at the top edge of the main section and the tray member 48 has a correspondingly configured tray attachment mechanism 88 that has generally U-shaped ends that are positioned around the outwardly extending members to allow the tray attachment mechanism 88 of the tray member 48 to engagedly slide along the rail 46 and, with locking mechanism 100, securely attach to the rail 46. A wide variety of other configurations can be utilized for the rail 46 and/or the tray member 48. Some of these embodiments can utilize a sliding arrangement to attach the tray member 48 to the rail 46. In other embodiments, the tray member 48 can removably attach to the rail 46 in a variety of non-sliding arrangements, such as the two components being cooperatively configured to be joined by being clipped, snapped, or the like. In addition, the components can be removably attached with a sufficiently strong magnetic arrangement or by other arrangements that will accomplish the objectives of the present invention. Such alternative arrangements will be generally well known to persons who are skilled in the relevant art.

The components of the new apparatus 10 can be made out a wide variety of different materials. In a preferred embodiment, the gripping members 40 are made out of cork or cork-like materials. Alternatively, gripping members 40 can be made out of one or more materials that are selected or modified to have an outer/gripping surface 42 that will provide the desired engagement between the apparatus 10, located on the mute 16, and the inner surface 22 of the bell 20 of the musical instrument 18. Likewise, the rails 46 and the tray members 48 of the new apparatus 10 can be made from a wide variety of different materials. In a preferred embodiment, the rails 46 and tray members 48 are molded from plastic or other materials that will allow the correspondingly configured rail attachment mechanism 66 and tray attachment mechanism 88 to be relatively easily and economically formed. Alternatively, the rails 46 and tray members 48 of the apparatus 10 can be made out various metals, composites or the like.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. An apparatus for attaching gripping members to a mute that is to be received in and utilized with a bell of a musical instrument to removably hold the mute in position inside the bell, said apparatus comprising:

- a rail sized and configured to be attached to an outer surface of the mute;
- a rail attachment mechanism on said rail;
- a tray member having a body with a top surface and a bottom surface;
- a tray attachment mechanism on said body of said tray member, said rail attachment mechanism of said rail and said tray attachment mechanism of said tray member being configured in corresponding arrangement to allow said tray member to be removably attached to said rail when said rail is attached to the outer surface of the mute; and
- a gripping member attached to or integral with said body of said tray member, said gripping member having an outer surface selected to grip the inner surface of the bell of the musical instrument when the mute is positioned inside the bell.

2. The apparatus of claim 1, wherein said rail has a surface attachment device on a body of said rail, said surface attachment device configured to secure a bottom surface of said rail to the outer surface of the mute.

3. The apparatus of claim 1, wherein said rail attachment mechanism and said tray attachment mechanism are cooperatively configured to allow said tray member to slidably engage said rail so as to removably position said tray member on said rail.

4. The apparatus of claim 3, wherein said rail attachment mechanism is on a first side and a second side of said rail and said tray attachment mechanism comprises a first rail engaging member and a second rail engaging member on said tray member.

5. The apparatus of claim 4, wherein each of said first side and said second side of said rail are dovetail shaped and each of said first rail engaging member and said second rail engaging member are shaped in corresponding engaging relation to said first side and said second side of said rail.

6. The apparatus of claim 4, wherein said first rail engaging member and said second rail engaging member form a cavity on said bottom surface of said tray member, said cavity sized and configured to receive said rail therein.

7. The apparatus of claim 1 further comprising a locking mechanism on at least one of said rail or said tray member, said locking mechanism structured and arranged to securely attach said tray member to said rail to prevent movement of said mute relative to the bell of the musical instrument while playing or moving the musical instrument with the mute inside the bell of the musical instrument.

8. The apparatus of claim 7, wherein said locking mechanism comprises a latch attached to or integral with said body of said tray member, said latch structured and arranged to engage said rail to lockedly secure said tray member to said rail.

9. The apparatus of claim 8, wherein said latch is defined by a flexible section of said body of said tray member so as to move upward and downward relative to said rail so as to releasably engage an engaging lip of said latch with said rail.

10. A gripping member attachment system, comprising:

- a musical instrument having a bell with an inner surface defining an interior area of said bell;
- a mute sized and configured to be utilized in said interior area of said bell of said musical instrument, said mute having a body with an outer surface; and
- an apparatus for removably positioning said mute in said interior area of said bell of said musical instrument to produce a gap allowing sound to exit said bell, said apparatus comprising a rail and a gripping unit, said gripping unit having a tray member and a gripping member, said rail attached to or integral with said outer surface of said mute, said rail having a rail attachment mechanism, said tray member having a tray attachment mechanism, said rail attachment mechanism of said rail and said tray attachment mechanism of said tray member configured in corresponding arrangement to allow said gripping unit to be removably attached to said rail on the outer surface of the mute, said gripping member attached to or integral with said tray member, said gripping member having an outer surface selected to grip the inner surface of the bell of the musical instrument when the mute is positioned in the bell with said gripping unit attached to said rail.

11. The system of claim 10, wherein said rail attachment mechanism and said tray attachment mechanism are cooperatively configured to allow said tray member to slidably engage said rail so as to removably position said tray member on said rail when said rail is attached to the outer surface of the mute.

12. The system of claim 11, wherein said rail attachment mechanism is on a first side and a second side of said rail and said tray attachment mechanism comprises a first rail engaging member and a second rail engaging member on said tray member, each of said first side and said second side of said rail being dovetail shaped and each of said first rail engaging member and said second rail engaging member are shaped in corresponding engaging relation to said first side and said second side of said rail.

13. The system of claim 10, wherein said apparatus has a locking mechanism on at least one of said rail or said tray member, said locking mechanism structured and arranged to securely attach said tray member to said rail to prevent movement of said mute relative to the bell of the musical instrument while playing or moving the musical instrument with the mute inside the bell of the musical instrument.

14. The system of claim 13, wherein said locking mechanism comprises a latch attached to or integral with said tray member, said latch defined by a flexible section of said tray member so as to move upward and downward relative to said rail so as to releasably engage an engaging lip of said latch with said rail to lockedly secure said tray member to said rail.

15. The system of claim 10, wherein said apparatus has a plurality of gripping units, said plurality of gripping units comprising at least a first gripping unit having a first unit thickness to produce a first gap when said mute is in said bell of said musical instrument and a second gripping unit having a second unit thickness that is less than or greater than said first unit thickness so as to produce a second gap that is less than or greater than said first gap when said mute is in said bell of said musical instrument.

16. A method for attaching gripping members to a mute that is to be received in and utilized with a bell of a musical instrument to removably hold the mute in position inside the bell, said method comprising the steps of:

(a) providing a plurality of sets of gripping units wherein each gripping unit has a gripping member attached to or integral with a tray member to produce a unit thickness that is common for each set of said plurality of sets of gripping units, with said gripping member having an outer surface that is selected to grip an inner surface of the bell and said tray member structured and arranged to engage one of a plurality of rails that are attached to or integral with an outer surface of the mute;

(b) selecting a first set from said plurality of sets of gripping units having a first unit thickness to use with the mute so as to position the mute in the bell of the musical instrument to produce a first gap between the mute and an outer edge of the bell;

(c) positioning one of said gripping units of said first set along one of said rails on the mute until a tray member of said gripping unit engages said rail so as to attach said gripping unit to the rail and secure a gripping member thereof to the mute;

(d) repeating step (c) for each of said rails on the mute;

(e) inserting the mute into the bell of the musical instrument to produce said first gap between the mute and an outer edge of the bell;

(f) removing the mute from the bell of the musical instrument;

(g) disengaging each of said gripping units of said first set of gripping units from each of said rails;

(h) selecting a second set from said plurality of gripping units having a second unit thickness that is less than or greater than said first unit thickness of said first set of gripping units to utilize with the mute so as to position the mute in the bell of the musical instrument to produce a second gap between the mute and the outer edge of the bell that is less than or greater than said first gap;

(i) positioning one of said gripping units of said second set along one of said rails on the mute until a tray member of said gripping unit engages said rail so as to position said gripping unit on said rail and secure a gripping member thereof to the mute;

(j) repeating step (i) for each of said rails on the mute; and (k) inserting the mute into the bell of the musical instrument to produce said second gap.

17. The method of claim 16, wherein said rail has a rail attachment mechanism and said tray member has a tray attachment mechanism, said rail attachment mechanism of said rail and said tray attachment mechanism of said tray member configured in corresponding arrangement to allow each of said gripping units to be slidably attached to said rails on the outer surface of the mute.

18. The method of claim 16 further comprising the step of forming said plurality of sets of gripping units before step (a) by attaching one of a plurality of said gripping members to one of a plurality of said tray members for each one of said plurality of sets of gripping units and selecting a plurality of rails to be utilized with each of said gripping units.

19. The method of claim 16, wherein said rails are attached to the outer surface of the mute and said method further comprises the step of attaching each of said rails to the outer surface of the mute prior to step (a), with each of said rails placed in spaced apart relation to each other along the outer surface of the mute.

20. The method of claim 16, wherein each of said gripping units has a locking mechanism structured and arranged to securely attach said gripping unit to said rail to prevent movement of said gripping unit relative to said rail, said method further comprising the step of sliding said gripping unit along said rail before step (e) until said locking mechanism engages said rail to lock said gripping unit on the rail and secure said gripping member thereof to the mute.

21. An apparatus for attaching gripping members to a mute that is to be received in and utilized with a bell of a musical instrument to removably hold the mute in position inside the bell, said apparatus comprising:

a tray member having a body with a top surface and a bottom surface;

a tray attachment mechanism on said body of said tray member, said tray attachment mechanism of said tray member configured in corresponding arrangement with a rail attachment mechanism of a rail attached to or integral with an outer surface of the mute so as to allow said tray member to be removably attached to the rail and be positioned on the mute; and a gripping member attached to or integral with said body of said tray member, said gripping member having an outer surface selected to grip the inner surface of the bell of the musical instrument when the mute is positioned inside the bell.

22. The apparatus of claim 21 further comprising a locking mechanism on at least one of the rail or said tray member, said locking mechanism structured and arranged to securely attach said tray member to the rail to prevent undesired movement of said mute relative to the bell of the musical instrument while playing or moving the musical instrument with the mute inside the bell of the musical instrument.

23. The apparatus of claim 22, wherein said locking mechanism comprises a latch attached to or integral with said body of said tray member, said latch structured and arranged to engage the rail to lockedly secure said tray member to the rail.

* * * * *